United States Patent
Zhu et al.

(10) Patent No.: US 12,391,846 B2
(45) Date of Patent: Aug. 19, 2025

(54) PREPOLYMER WITH MULTIPLE FUNCTIONAL GROUPS FOR PRINTING THREE-DIMENSIONAL OBJECTS AND METHOD OF USING THE SAME

(71) Applicant: LUXCREO (BEIJING) INC., Beijing (CN)

(72) Inventors: Guang Zhu, Ningbo (CN); Yisi Lu, Ningbo (CN); Jie Gao, Ningbo (CN); Fan Zhang, Ningbo (CN)

(73) Assignee: LUXCREO (BEIJING) INC., Beijing (CN)

( * ) Notice: Subject to any disclaimer, the term of this patent is extended or adjusted under 35 U.S.C. 154(b) by 535 days.

(21) Appl. No.: 17/457,260

(22) Filed: Dec. 2, 2021

(65) Prior Publication Data

US 2022/0089903 A1    Mar. 24, 2022

Related U.S. Application Data

(63) Continuation of application No. PCT/CN2020/100049, filed on Jul. 3, 2020.

(60) Provisional application No. 62/872,062, filed on Jul. 9, 2019.

(51) Int. Cl.

| | | |
|---|---|---|
| C09D 175/16 | (2006.01) | |
| B29C 64/129 | (2017.01) | |
| B29K 75/00 | (2006.01) | |
| B29K 105/00 | (2006.01) | |
| B33Y 10/00 | (2015.01) | |
| B33Y 70/00 | (2020.01) | |
| C08G 18/12 | (2006.01) | |
| C08G 18/24 | (2006.01) | |
| C08G 18/28 | (2006.01) | |
| C08G 18/48 | (2006.01) | |
| C08G 18/67 | (2006.01) | |
| C08G 18/73 | (2006.01) | |
| C08G 18/75 | (2006.01) | |
| C09D 175/12 | (2006.01) | |

(52) U.S. Cl.
CPC ......... C09D 175/16 (2013.01); B29C 64/129 (2017.08); B33Y 10/00 (2014.12); B33Y 70/00 (2014.12); C08G 18/12 (2013.01); C08G 18/246 (2013.01); C08G 18/286 (2013.01); C08G 18/4854 (2013.01); C08G 18/6755 (2013.01); C08G 18/73 (2013.01); C08G 18/755 (2013.01); C09D 175/12 (2013.01); B29K 2075/00 (2013.01); B29K 2105/0002 (2013.01)

(58) Field of Classification Search
CPC .. C09D 175/16; C09D 175/12; B29C 64/129; B33Y 10/00; B33Y 70/00; C08G 18/12; C08G 18/246; C08G 18/286; C08G 18/4854; C08G 18/6755; C08G 18/73; C08G 18/755; C08G 18/10; C08G 18/672; B29J 2075/00; B29J 2105/002; C08L 75/08

See application file for complete search history.

(56) References Cited

U.S. PATENT DOCUMENTS

| | | |
|---|---|---|
| 3,639,657 A | 2/1972 | Moran, Jr. et al. |
| 3,932,357 A | 1/1976 | Schmitt et al. |
| 4,430,489 A | 2/1984 | MacMillan et al. |
| 5,231,147 A | 7/1993 | Hartman et al. |
| 9,676,963 B2 | 6/2017 | Rolland et al. |
| 2007/0213497 A1 | 9/2007 | Nagaraj et al. |
| 2013/0316154 A1 | 11/2013 | Ueda et al. |
| 2017/0173872 A1 | 6/2017 | McCall et al. |
| 2018/0046076 A1 | 2/2018 | Letko et al. |
| 2018/0370125 A1* | 12/2018 | Rolland ............... B29C 64/129 |
| 2020/0190357 A1 | 6/2020 | Rolland et al. |

FOREIGN PATENT DOCUMENTS

| | | |
|---|---|---|
| CN | 104961881 A | 10/2015 |
| CN | 109232825 A | 1/2019 |
| WO | 2016145050 A1 | 9/2016 |
| WO | 2018183440 A1 | 10/2018 |

OTHER PUBLICATIONS

First Office Action in Chinese Application No. 202080045062.8 mailed on May 27, 2022, 19 pages.

International Search Report in PCT/CN2020/100049 mailed on Sep. 28, 2020, 5 pages.

Written Opinion in PCT/CN2020/100049 mailed on Sep. 28, 2020, 5 pages.

Velankar, Sachin et al., High-Performance UV-Curable Urethane Acrylates via Deblocking Chemistry, Journal of Applied Polymer Science, 62(9): 1361-1376, 1996.

* cited by examiner

*Primary Examiner* — Jessica M Roswell
(74) *Attorney, Agent, or Firm* — Metis IP LLC

(57) ABSTRACT

A prepolymer with multiple functional groups is disclosed. The embodiments of the prepolymer may have the compound of formula X:

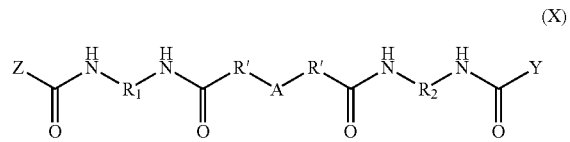

A polymerizable liquid comprising such prepolymer that can be used for producing three-dimensional objects by methods of additive manufacturing and the method using such polymerizable liquid to form three-dimensional objects is also described.

19 Claims, 1 Drawing Sheet

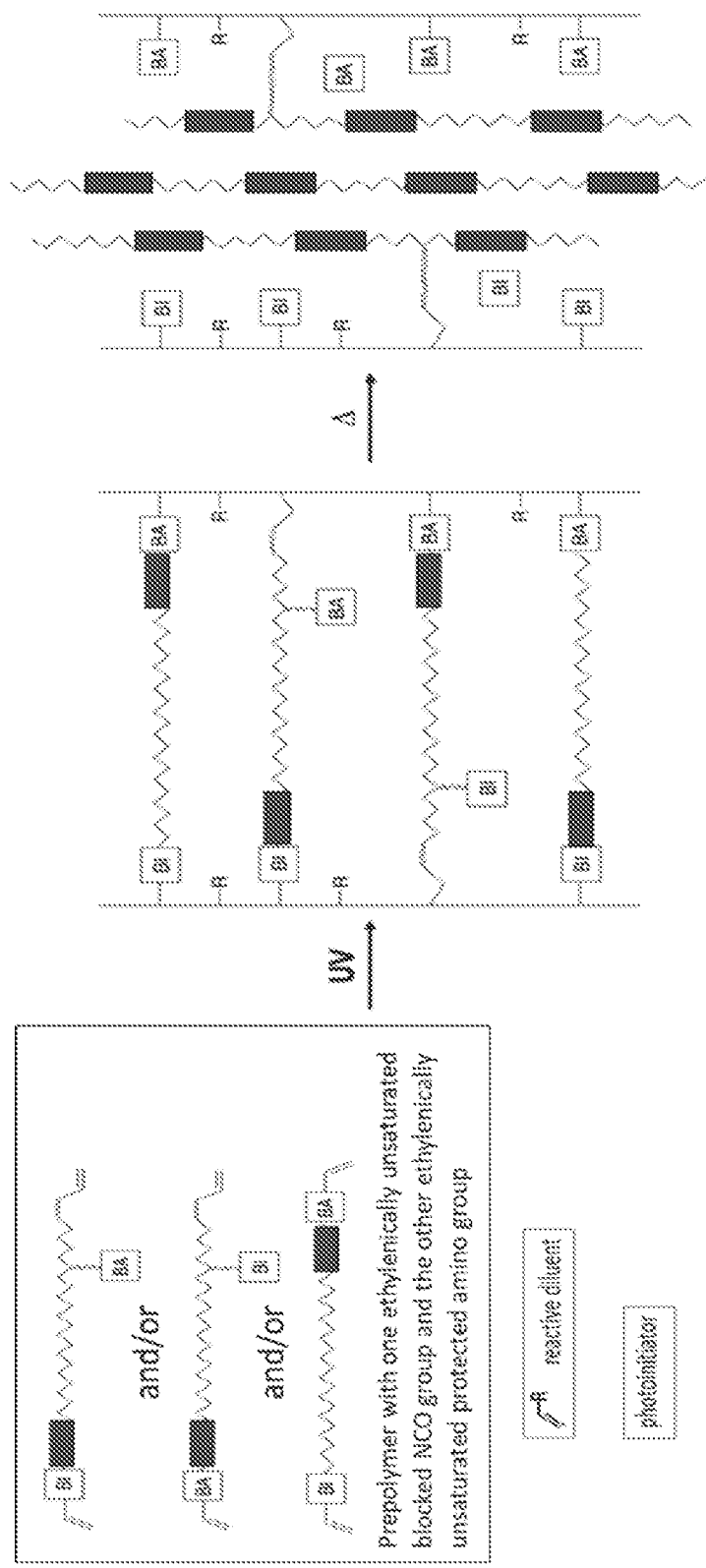

PREPOLYMER WITH MULTIPLE FUNCTIONAL GROUPS FOR PRINTING THREE-DIMENSIONAL OBJECTS AND METHOD OF USING THE SAME

CROSS-REFERENCE TO RELATED APPLICATION

This application is a Continuation of International Application No. PCT/CN2020/100049, filed on Jul. 3, 2020, which claims priority to U.S. Provisional Patent Application Ser. No. 62/872,062, filed Jul. 9, 2019. The subject matter of all of the foregoing is incorporated herein by reference in its entirety.

TECHNICAL FIELD

This disclosure relates generally to prepolymer with multiple functional groups and methods of using polymerizable liquid containing such prepolymer for producing three-dimensional objects.

BACKGROUND

Photopolymerization 3D printing technology uses photopolymerizable resins as raw materials, and solidifies such liquid photopolymerizable resins under visible or ultraviolet light irradiation. The photopolymerizable resin is generally in a liquid state, and it undergoes photopolymerization under irradiation of visible or ultraviolet light of a certain wavelength to complete curing. In a typical photopolymerization 3D printing process, the three-dimensional object is built up one layer at a time. Each layer is formed by projecting a two-dimensional pattern for that layer into a photopolymerizable liquid, thus curing the liquid to form a solid shape that matches the two-dimensional pattern. The pattern typically is displayed on a programmable display, such as those based on LCD (liquid crystal display) or DLP (digital light processing, which is based on digital micromirror devices) technologies. The pattern is projected by optics from the display device onto the liquid. Because the display device is programmable, the pattern on the display can be changed for different layers.

In conventional photopolymerization 3D printing process, two type of printing techniques are commonly used, top-down printing and bottom-up printing. In the "top-down" printing, the photopolymerizable resin is cured by a light source placed above the resin reservoir on a build platform where the 3D object is cured and attached to. Once the current layer is cured, the build platform is lowered down into the resin reservoir for the next layer. Each new layer is formed on the upper surface of the 3D object to be formed. By contrast, in the "bottom up" printing, the photopolymerizable resin is cured through a light-transmissive window in the bottom of the resin reservoir by a light source from below. Each new layer is formed on the bottom surface of the 3D object to be formed. In "bottom-up" printing, the build platform is raised out of the resin reservoir and a 'peel' step is required between each layer in order to detach the cured layer from the bottom surface of the resin reservoir. Continuous Liquid Interface Production (CLIP) is one of bottom-up 3D printing techniques where photopolymerizable resin is cured through an oxygen permeable window in the bottom of the resin reservoir by a light source from below. The oxygen layer (called as "dead zone" or "inhibition layer") over the window keeps the liquid resin from sticking to the bottom surface of the resin reservoir and continuous light exposure can be utilized because no 'peel' step is required. However, this type of printing technique also has its limitations. For example, the dead zone is highly temperature sensitive and minor temperature fluctuation may cause the print to fail.

U.S. Pat. No. 9,676,963 disclosed a method of forming a three-dimensional object using a polymerizable liquid comprising a mixture of a first light polymerizable liquid component and a second solidifiable component that is different from the first component. However, such method uses a mixture of at least two different components and the viscosity will significantly increase after the two components are mixed together since some components may solidify prematurely. As a result, the three-dimensional printing process must start within hours of these two components being mixed, otherwise the mixture would become too viscous to use. This requires the separate storage of different components, which increases the complexity of the manufacturing process.

Thus, there is a need for better materials and methods for manufacturing three-dimensional objects using photopolymerizable 3D printing techniques.

SUMMARY

Described herein are methods and materials to produce three-dimensional objects by additive manufacturing. Embodiments provide a prepolymer compound of formula X:

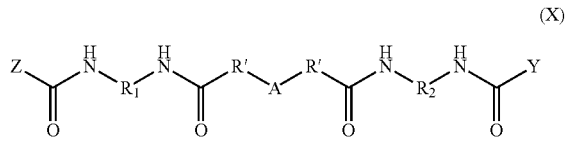

wherein:
Z is a blocking group;
$R_1$, $R_2$ and A are each independently selected a hydrocarbyl group;
R' is NH or O; and
Y comprises an amino alcohol or diamine moiety.

In some embodiments, the blocking group Z in the prepolymer comprises a reactive epoxy, alkene, alkyne, or thiol terminal group. In some embodiments, Z is tert-butyl aminoethyl methacrylate (t-BAEMA).

In some embodiments, the blocking group Z in the prepolymer comprises an oxime moiety. In some embodiments, Z is 2-butanone oxime.

In some embodiments, Y in the prepolymer comprises an amino alcohol moiety with more than one terminal hydroxyl groups.

In some embodiments, Y in the prepolymer comprises a photopolymerizable group. In some embodiments, the photopolymerizable group comprises an acrylate or methacrylate group.

In some embodiments, Z in the prepolymer comprises a reactive terminal group and Y is an amino alcohol.

In some embodiments, Z in the prepolymer is non-reactive and Y is a diamine.

In some embodiments, the free end of Y in the prepolymer is attached with a protecting group that protects the hydroxyl group of the amino alcohol or the amino group of the diamine. In some embodiments, the protecting group comprises an aldehyde or a ketone moiety. In some embodiments, the protecting group further comprises a photopolymerizable terminal group.

In some embodiments, A in the prepolymer is a branched hydrocarbyl group and comprises a photopolymerizable terminal group.

The present invention further provides a polymerizable liquid that can be used for producing three-dimensional objects by methods of additive manufacturing. The polymerizable liquid comprises:
(a) a prepolymer as described herein;
(b) (optionally) reactive diluent;
(c) a photoinitiator; and
(d) (optionally) a blocked or reactively blocked diisocyanate.

The present invention further provides a method of forming a three-dimensional object, comprising:
(a) providing a printing region defined by a forming platform and a resin reservoir having a forming surface;
(b) filling the printing region with a polymerizable liquid described herein;
(c) exposing the printing region to energy to form a solid printing intermediate having substantially the same shape as the three-dimensional object;
(d) (optional) washing the printing intermediate; and
(e) heating, microwave irradiating, or using other methods to provide energy to the printing intermediate to form the three-dimensional object.

In some embodiments, the three-dimensional object comprises a copolymer of polyurethane and polyacrylate.

In some embodiments, the heating step in the method occurs in the range of ambient temperature to 200° C. for 2 to 12 hours.

BRIEF DESCRIPTION OF THE DRAWINGS

This disclosure is not limited to the particular systems, devices and methods described, as these may vary. The terminology used in the description is for the purpose of describing the particular versions or embodiments only, and is not intended to limit the scope. While various compositions and methods are described in terms of "comprising" various components or steps (interpreted as meaning "including, but not limited to"), the compositions and methods can also "consist essentially of" or "consist of" the various components and steps, and such terminology should be interpreted as defining essentially closed-member groups.

Embodiments of the disclosure have other advantages and features which will be more readily apparent from the following detailed description and the appended claims, when taken in conjunction with the examples in the accompanying drawings, in which:

FIG. 1 is a schematic illustration of one embodiment of the curing scheme of the polymerizable liquid comprising the prepolymer with multiple functional groups as described herein.

DETAILED DESCRIPTION

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

"Diisocyanate" and "polyisocyanate" are used interchangeably and refer to aliphatic, cycloaliphatic, aromatic isocyanates that have at least 2, or in some embodiments more than 2, isocyanate (NCO) groups per molecule, on average.

"Diol" and "polyol" are used interchangeably and refer to aliphatic, cycloaliphatic, aromatic alcohols that have at least 2, or in some embodiments more than 2 hydroxyl (OH) groups per molecule, on average.

As used herein, the term "and/or" refers to any and all possible combinations of one or more listed components, as well as any and all possible of single component that lacks of any combination. For example, "A, B, and/or C" means all of the following possibilities: A alone, B alone, C alone, A and B, A and C, B and C, A, B and C.

As used herein, the term "visible light" refers to electromagnetic radiation having wavelengths in the range of 400 to 700 nanometers (nm). "Ultraviolet light" as used here refers to electrometric radiation having wavelength in the range of 10 to 400 nanometers (nm).

As used herein, the term "stereolithography" or "photopolymerization" refers to a technique for making three-dimensional objects using light-initiated photopolymerization of liquid resin with the presence of photoinitiator.

As used herein, the term "curing", "solidification" or "polymerization" refers to a process of reacting monomers, oligomers, prepolymers, and/or polymers, with or without a curing agent to form a three-dimensional polymeric network.

Prepolymer compounds as described herein may be used in additive manufacturing industry to produce three-dimensional objects. In some embodiments, the prepolymer compound has the following formula (X):

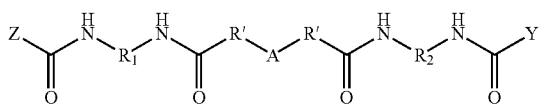

(X)

wherein:
Z is a blocking group;
$R_1$, $R_2$ and A are each independently selected a hydrocarbyl group;
R' is NH or O, and
Y comprises an amino alcohol or diamine moiety.

In some embodiments, $R_1$, $R_2$ and A of the prepolymer described herein may be a linear or branched alkyl or alkylene, alkenyl or alkenylene, aryl or arylene, heteroaryl or heteroarylene, cycloalkyl or cycloalkenyl hydrocarbyl group. In some embodiments, A is a branched hydrocarbyl group and comprises a photopolymerizable terminal group. In some embodiments, the photopolymerizable terminal group may comprise an acrylate, a methacrylate, an alkene, a N-vinyl, a vinyl amide, a vinyl ether, a vinyl ester, an acrylamide, a meth acrylamide, a styrene, an acrylate acid, an epoxy, a thio, a 1,3-dienes, a vinyl halide, an acrylonitrile, a vinyl ester, a maleimide, a vinyl ether, and combination of two or more of the foregoing.

In some embodiments, the linkage between the blocking group Z and the isocyanate groups (—NCO) is thermally or otherwise labile so that under proper conditions, for example heating, such linkage may break to expose the isocyanate groups (—NCO), enabling the free isocyanate functional group to react with other functional groups for further reaction. Examples of the NCO blocking group Z may include but not limited to phenols, nonyl phenols, pyridinols, oximes, thiophenols, mercaptans, amides, cyclic amides, imides, imidazole, imidazoline, methylethylketoxime (MEKO), alcohols, ε-caprolactam, pyrazoles, triazoles, amidines, hydroxamic acid ester.

In some embodiments, the NCO blocking group Z optionally comprises a reactive terminal group, which makes the prepolymer reactively blocked. Examples of the reactive terminal group of Z may include but not limited to epoxy, alkene, alkyne, thio, vinyl either. In one embodiment, the blocking group Z is tert-butyl aminoethyl methacrylate (t-BAEMA) with the following formula:

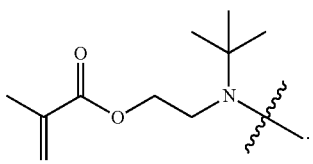 [SMILES: *N(CCOC(=O)C(=C)C)C(C)(C)C]

In this example, the steric hindrance of the large tertiary butyl group makes the linkage between the blocking group and the isocyanate (—NCO) group thermally labile. Cleavage of this linkage may be expected upon heating, allowing the isocyanate (—NCO) functional group for further reaction. In other examples, the blocking group Z may be tertiary phenylaminoethyl methacrylate (TPAEMA), tertiary hexylaminoethyl methacrylate (THAEMA), tertiary-butylaminopropyl methacrylate (TBAPMA), and mixture thereof. Those skilled in the art may couple (meth)acrylate groups to known NCO blocking agents as identified above.

In some examples of the prepolymer identified herein, Y may be amino alcohol with the amino group side attached to the prepolymer and the hydroxyl functional group at the free end. Examples of amino alcohol may include but not limited to ethanolamine, 2-(methylamino) ethanol, 3-amino-1-propanol, amino-2-propanol, 2-(ethylamino) ethanol, 2-Amino-1-butanol, 2-amino-2-methyl-1-propanol, 2-amino-2-methyl-1-propanol, 4-amino-1-butanol, aminocyclohexanol aminobenzyl alcohol. In some embodiments, Y may comprise more than one terminal hydroxyl group. Examples of amino alcohols having more than one hydroxyl group may include but not limited to 3-amino-1,2-propanediol, serinol, 3-methylamino-1,2-propanediol, diethanolamine, and tris (hydroxymethyl) aminomethane.

In some examples of the prepolymer disclosed herein, Y may be a diamine with one amino group attached to the prepolymer and another amino functional group at the free end. Examples of diamine may include but not limited to linear, branched, cyclic, xylylenediamines, aromatic diamines.

In some embodiments, the prepolymer may further comprise a protecting group that protects the hydroxyl functional groups or amino functional groups contained in Y. In these embodiments, the prepolymer compound may have a formula ($X_1$) or formula ($X_2$):

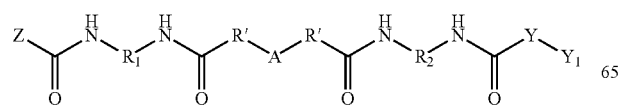

or

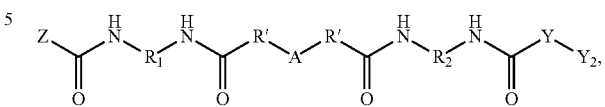

wherein $Y_1$ is a hydroxyl group protecting group that protects the terminal hydroxyl group of Y when Y is amino alcohol and $Y_2$ is an amino group protecting group that protects the terminal amino group of Y when Y is diamine.

Examples of the hydroxyl group protecting group $Y_1$ may include but not limited to a silicon ether, a benzyl ether, a substituted benzyl ether, a substituted methyl ether, an alkoxymethyl ether, an allyl ether, an acyl ether and a combination thereof. In some embodiments, the silicon ether may comprise a trimethylsilyl ether (TMS), a t-Butyldimethylsilyl ether (TBDMS), a tert-butyldiphenylsilyl ether (TBDPS), a triisopropylsilyl ether (TIPS), and a combination thereof. In some embodiments, the benzyl ether (Bn) may comprise an alkyl hydroxy benzyl ether, a p-methoxybenzyl ether (PMB), a trityl ether, and a combination thereof. In some embodiments, the alkoxymethyl ether may comprise a 2-tetrahydropyran ether (THP), a methoxymethyl acetal (MOM), a 2-ethoxyethyl ether (EE), 2-(Trimethylsilyl)ethoxy]methyl acetal (SEM) and a combination thereof. In some embodiments, the hydroxyl group protecting group may comprise an acetyl, a benzoyl, a pivaloyl, an acetate, a benzoate, a pivalate, and a combination thereof. In some embodiments, the hydroxyl group protecting group $Y_1$ may also comprise 2,2,2,-trichloroethyl carbonate, 2-methoxyethoxymethyl ether, 2-naphthylmethyl ether, 4-methoxybenzyl ether, acetate, benzoate, benzyl ether, benzyloxymethyl acetal, ethoxyethyl acetal, methoxymethyl acetal, methoxypropyl acetal, methyl ether, tetrahydropyranyl acetal, triethylsilyl ether, triisopropylsilyl ether, trimethylsilyl ether, tert-butyldiphenylsilyl ether, acetonide, benzaldehyde acetal, carbonate, benzaldehyde acetal, di-tert-butyl dioxasilinane, and a combination thereof. More examples of the hydroxyl group protection groups can be found in Protective Groups in Organic Chemistry, J. McOmie, Springer Science & Business Media, declaration 2012.

Examples of the amino group protecting group $Y_2$ may include but not limited to an alkoxycarbonyl, an acyl group, an alkyl group, and a combination thereof. In some embodiments, the alkoxycarbonyl group may comprise a benzyloxycarbonyl

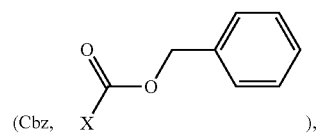

(Cbz, X      ), a tert-butoxycarbonyl

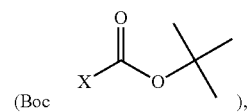

(Boc    X     ), a methoxycarbonyl

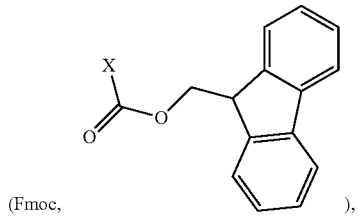
(Fmoc), an allyloxycarbonyl

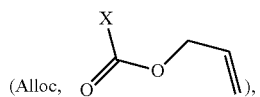
(Alloc), a trimethylsilyloxycarbonyl

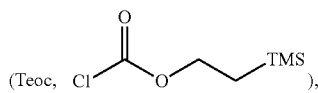
(Teoc), a methoxycarbonyl or an ethoxycarbonyl

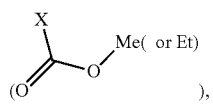

and a combination thereof. In some embodiments, the acyl group may comprise a phthalate

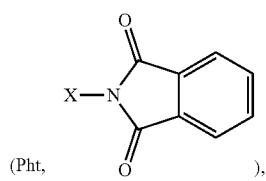
(Pht), a p-toluenesulfonyl

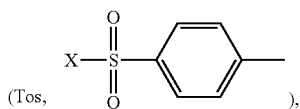
(Tos), a trifluoroacetyl

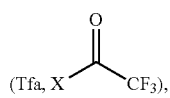
(Tfa), and a combination thereof. In some embodiments, the alkyl group may comprise a triethylmethyl

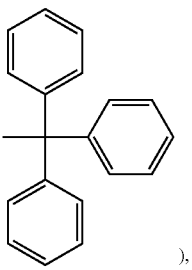
(Trt), a 2,4-dimethoxybenzyl

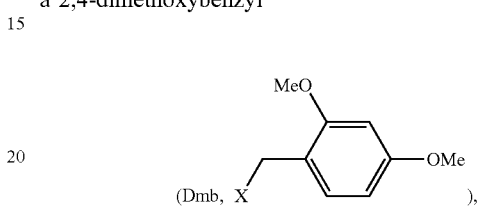
(Dmb), a p-methoxybenzyl

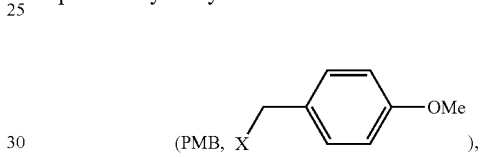
(PMB), a benzyl

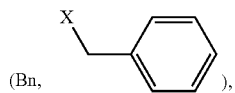
(Bn), and a combination thereof. In some embodiments, the amino group protecting group $Y_2$ may also comprise 1-chloroethyl carbamate, 4-methoxybenzenesulfonamide, acetamide, benzylamine, benzyloxy carbamate, formamide, methyl carbamate, trifluoroacetamide, and a combination thereof. More examples of the amino group protecting groups can be found in Protective Groups in Organic Chemistry, J. McOmie, Springer Science & Business Media, declaration 2012.

In some embodiments, when Y is diamine, the protecting group $Y_2$ may comprise carboxylic acid groups, anhydride groups (an example of such anhydride is di-tert-butyl decarbonate ($Boc_2O$), acid chloride groups (examples were described in U.S. Pat. Nos. 5,231,147, 3,639,657, 4,430,489, the disclosure of which are incorporated herein by reference), aldehyde or ketone groups (examples were described in U.S. Pat. No. 3,932,357, the disclosure of which is incorporated herein by reference), complexes of metal salts (an example of such metal salt, methylenedianiline-NaCl was described in US Patent Application US20070213497A1, the disclosure of which is incorporated herein for reference).

In some embodiments, the amino protecting group $Y_2$ in its unsubstituted form may have a compound of the following formula:

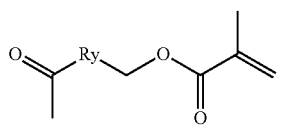

(the O atom in the ketone group will be substituted when coupled to amino group of Y to protect it), wherein Ry may be:
(1) linear or branched hydrocarbyl groups. In some embodiments, the number of carbon atoms in the hydrocarbyl groups may be in the range of 1-10. In one example, the protecting group $Y_2$ in its unsubstituted form may have the molecular structure as the following:

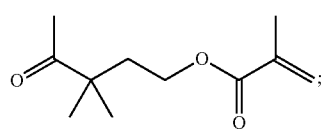

in another example, the protecting group $Y_2$ in its unsubstituted form may have the molecular structure as the following:

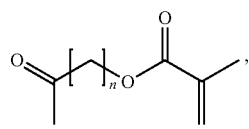

wherein n may be an integer in the range of 1-10;
(2) repeating units comprising alkoxy group. In some embodiments, the number of the repeating units may be in the range of 1-10. In one example the protecting group $Y_2$ in its unsubstituted form may have the molecular structure as the following:

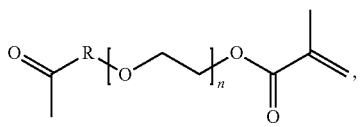

wherein n may be an integer in the range of 1-10 and R is a linear or branched hydrocarbyl group;
(3) repeating units comprising ester group;
(4) repeating units comprising siloxy group; or
(5) repeating units comprising thioether group.

In some embodiments, the protecting groups $Y_1$ and/or $Y_2$ may further comprise a photopolymerizable group. Examples of such photopolymerizable groups may include but not limited to an acrylate, a methacrylate, an alkene, a N-vinyl, an acrylamide, a methacrylamide, a styrene, an epoxy, a thio, a 1,3-dienes, a vinyl halide, an acrylonitrile, a vinyl ester, a maleimide, a vinyl ether, and combination of two or more of the foregoing. In one example, the protecting group may comprise a photopolymerizable (meth)acrylate group.

Some examples of the preparation of the protecting group $Y_2$ described above is shown in the Schemes below:

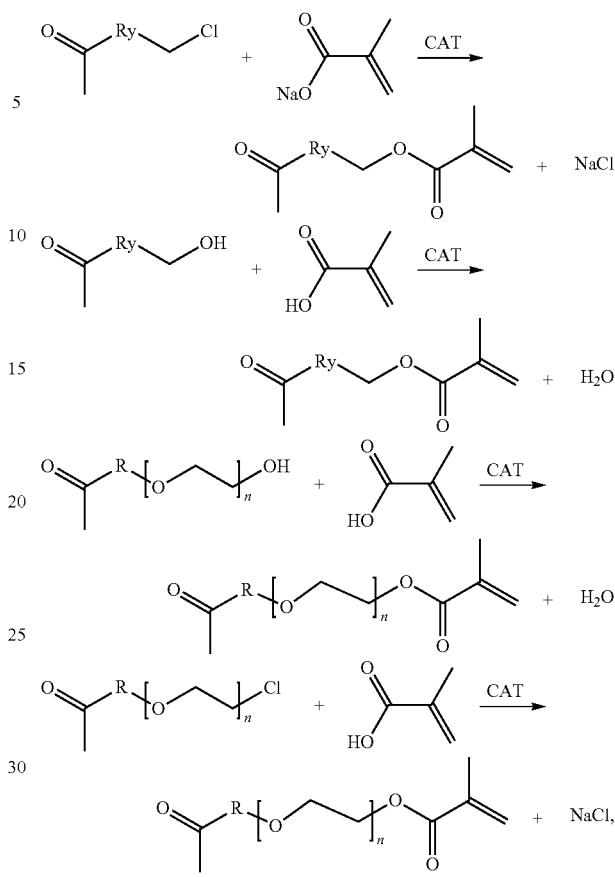

wherein CAT is a phase transfer catalyst. Examples of such phase transfer catalyst that can be used here may comprise amine salts (such as benzyltriethylammonium chloride (TEBA) or ammonium bromide (TEBA-Br), benzyltrimethylammonium chloride, ammonium bromide or ammonium hydroxide (Triton B), tetrabutyl chloride Ammonium bromide, ammonium iodide or ammonium hydroxide, cetyltrimethylammonium bromide, ammonium chloride, tetra-n-hexylammonium bromide, ammonium chloride, etc.), crown ethers (such as 15-crown-5, 18-crown-6, dibenzo-18-crown-6, etc.), phosphonium salts (such as tributylphosphonium bromide, ethyltriphenylphosphonium bromide, tetraphenylphosphonium chloride, etc.) In some embodiments, the phase transfer catalyst may be used together with agents such as dicyclohexylcarbodiimide (DCC) to promote the esterification reaction.

In some embodiments, the protecting group $Y_2$ in its unsubstituted form may be methyl isobutyl ketone (MIBK), where the O atom in the ketone group will be substituted when coupled to the amino group to protect it.

In some embodiments, the prepolymer described herein can be prepared starting with a polyisocyanate oligomer synthesized by the reaction of at least one diisocyanate and one polyol. The polyisocyanate is then reacted with the blocking agent first to have the isocyanate functional group (NCO) blocked at one end first. Then the prepolymer will react with chain extending agent, e.g., amino alcohol or diamine to attach at least one hydroxyl functional group or one amino functional group at the other end of the prepolymer. In some embodiments, the hydroxyl functional group or amino functional group are protected in order to control when the protected hydroxyl group or amino group will be exposed for chain extending reaction with the NCO functional group. In some embodiments, the protecting agent to protect the hydroxyl functional group or amino functional group will further comprise a photopolymerizable terminal group.

Examples of diisocynate to prepare the polyisocyanate oligomer may include but not limited to isophorone diisocyanate (IPDI), hexamethylene diisocyanate (HDI), methylenebis (phenyl isocyanate) (MDI), toluene diisocyanate (TDI), naphthalene diisocyanate (NDI), methylene bis-cyclohexylisocyanate (HMDI). Examples of polyols to prepare the polyisocyanate oligomer may include but not limited to polyether polyols and polyester polyols. One specific example of polyol is poly (propylene oxide) (PPO). Another example of polyol is polytetramethylene oxide (PTMO). Examples of such reaction schemes were described in Velankar, Pazos, and Cooper, Journal of Applied Polymer Science 162, 1361 (1996), the disclosures of which is incorporated by reference herein in their entirety.

In some embodiments, when the prepolymer described herein comprises the hydroxyl functional group at one end, the isocyanate functional group at the other end of the prepolymer is preferred blocked with reactive blocking agent. In some embodiments, when the prepolymer described herein comprises the amino functional group at one end, the isocyanate functional group at the other end of the prepolymer is preferred blocked with non-reactive blocking agent. As a chain extending functional group, amino group is more reactive than hydroxyl group. As a result, when amino functional group is used in the prepolymer, the isocyanate functional group is preferred blocked with non-reactive blocking agent, which requires higher unblocking temperature, to ensure the stability of the prepolymer during storage or transportation.

An example of the preparation of the prepolymer described herein starting with isophorone diisocyanate (IPDI) and polytetramethylene oxide (PTMO) is shown in the Scheme below. In this example, the isocyanate functional group at one end of the prepolymer is blocked with tert-butyl aminoethyl methacrylate (t-BAEMA) and the isocyanate group at the other end reacts with an amino alcohol with the terminal hydroxyl group unprotected.

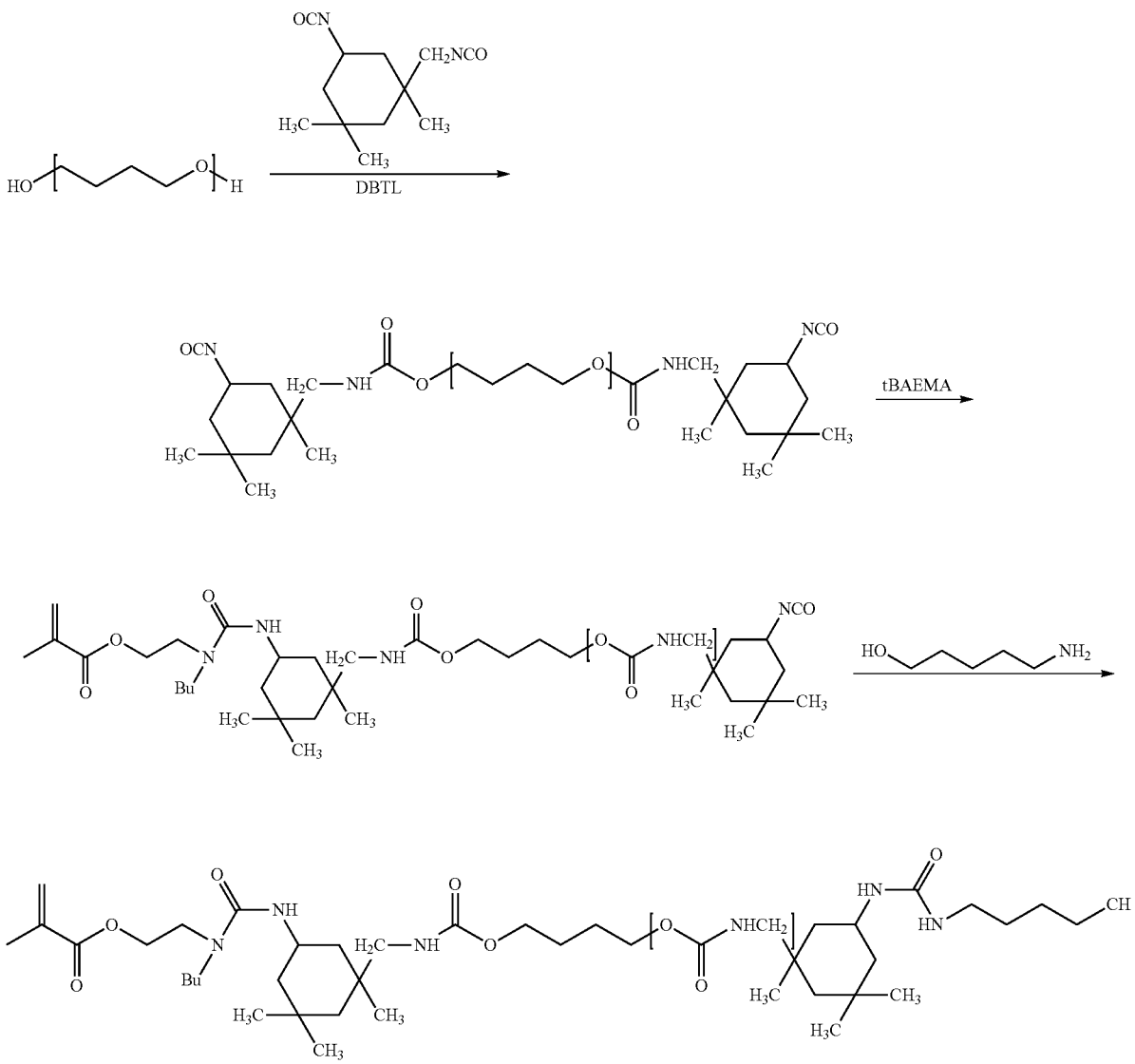

Another example of the preparation of the prepolymer described herein is shown in the Scheme below. In this example, the isocyanate functional group at one end of the prepolymer is blocked with methylethyl ketone oxime and the isocyanate group at the other end reacts with a diamine protected with ketone and having a photopolymerizable methacrylate terminal group.

a vinyl ester, an acrylamide, a meth acrylamide, a styrene, an acrylate acid, an epoxy, a thio, a 1,3-dienes, a vinyl halide, an acrylonitrile, a vinyl ester, a maleimide, a vinyl ether, and combination of two or more of the foregoing. In some embodiments, the photopolymerizable monomer or oligomer may comprise epoxy/amine, epoxy/hydroxy, oxetane/amine, oxetane/hydroxy. Reactive diluents may decrease the

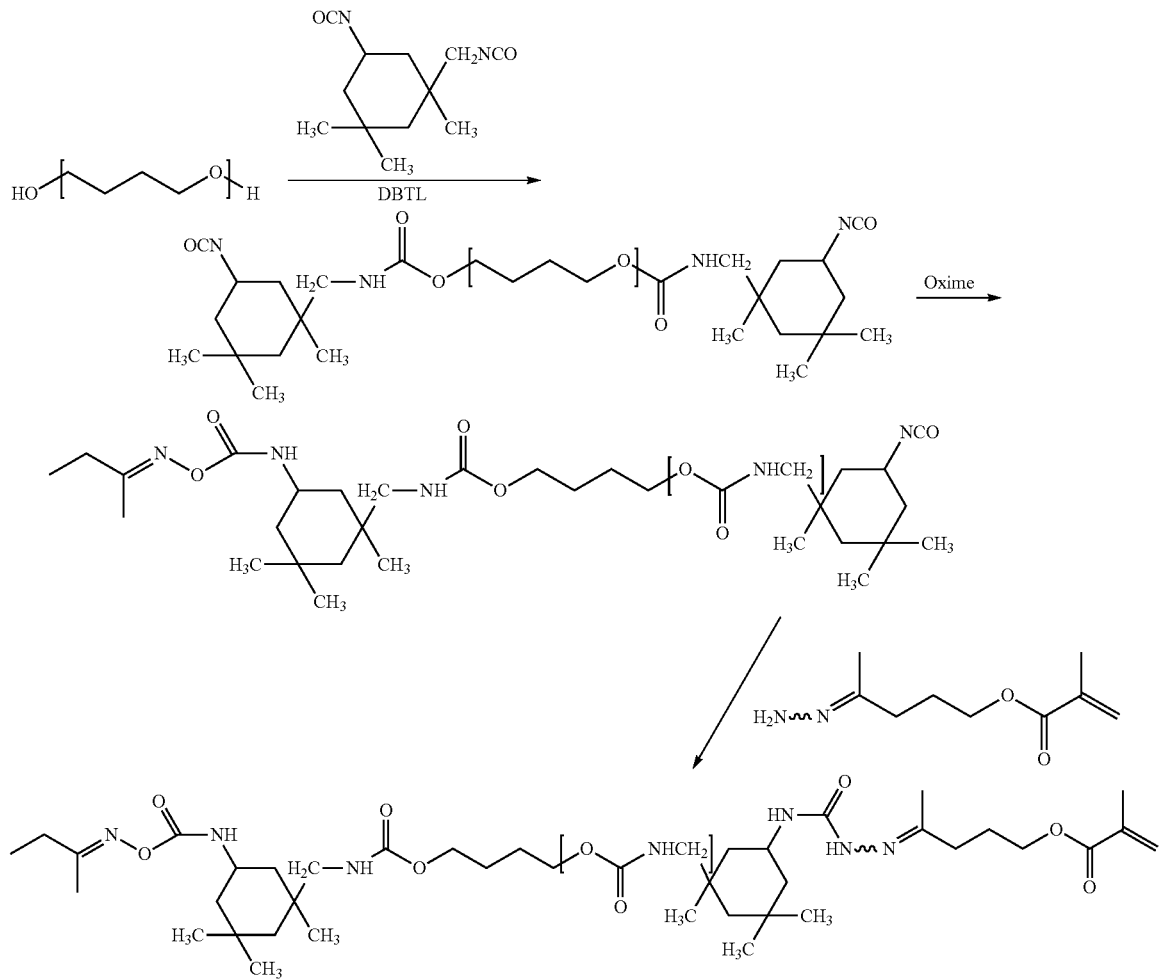

A polymerizable liquid that can be used for producing three-dimensional objects by methods of additive manufacturing. The polymerizable material comprises:

(a) a prepolymer as described herein;

(b) (optionally) reactive diluent;

(c) a photoinitiator; and (d) (optionally) a blocked or reactively blocked diisocyanate.

In some embodiments, the reactive diluent may be photopolymerizable monomer or oligomer having photopolymerizable groups. In some embodiments, the photopolymerizable groups may be groups that can undergo radical polymerization. In other embodiments, photopolymerizable groups may be groups that can undergo cationic polymerization. In some embodiments, the photopolymerizable monomer or oligomer may comprise an acrylate, a methacrylate, an alkene, a N-vinyl, a vinyl amide, a vinyl ether, viscosity of the photopolymerized polymer network and copolymerize with photopolymerizable components in the polymerizable liquid.

In some embodiments, the reactive diluent may have degree functionality of one or more than one. Some examples of reactive diluent may include but not limited to: 1,3-propanediol diacrylate and dimethacrylate, 1,4-butanediol diacrylate and dimethacrylate, 1,5-pentanediol diacrylate and dimethacrylate, 1,6-hexanediol diacrylate and dimethacrylate, 1,7-heptanediol diacrylate and dimethacrylate, 1,8-octanediol diacrylate and dimethacrylate, trimethylolpropanetriol triacrylate and trimethacrylate, ethoxylated trimethylolpropanetriol triacrylate and trimethacrylate, neopentyl glycol diacrylate and dimethacrylate, tripropylene glycol diacrylate and dimethacrylate, pentaerythritol triacrylate and trimethacrylate, pentaerythritol tetraacrylate and tetramethacrylate, and the like. In some embodiments, certain reactive diluent or certain combination of reactive diluents are chosen in order to increase the solubility of the photoinitiator used herein. In preferred embodiments, monomers with low degree of functionality are used to increase solubility of photoinitiators with the powder form.

Photoinitiator may be any suitable photoinitiator that can initiate the photopolymerization reaction with the light source used to initiate the photopolymerization reaction. In some embodiments, the wavelength used to initiate the photopolymerization process is 405 nm and in other embodiments, the wavelength is 385 nm. Examples of photoinitiators may include but not limited to benzoin ethers

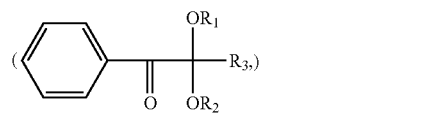

dialkoxy acetophenones

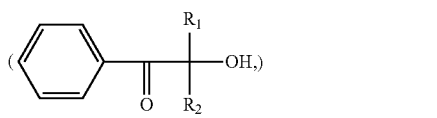

hydroxy alkyl ketones

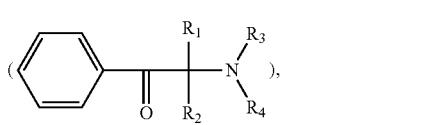

acyl phosphine oxides

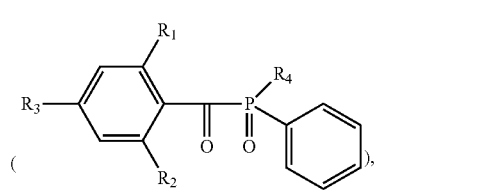

amino ketones

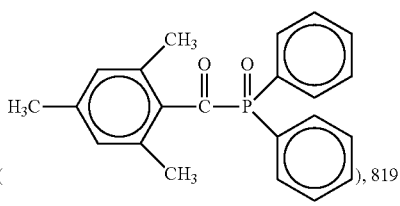

benzophenones

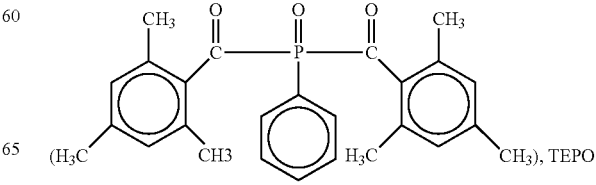

thioxanthones

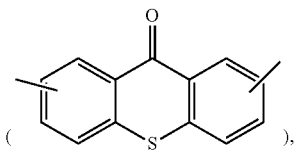

1,2 diketones

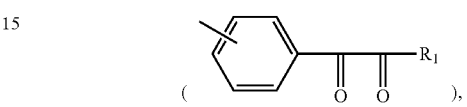

camphorquinone

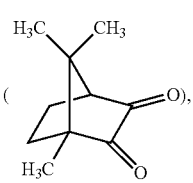

bis(.eta.5-2,4-cylcopentadien-1-yl)-bis(2,6-difluoro-3-(1H-pyrrol-1-yl)-phenyl) titanium

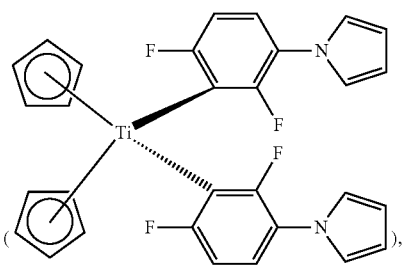

where Rn is any number of other atoms, including H, O, C, N, S. In some preferred embodiments, photoinitiators used herein are benzoyl phosphine oxides, including: TPO

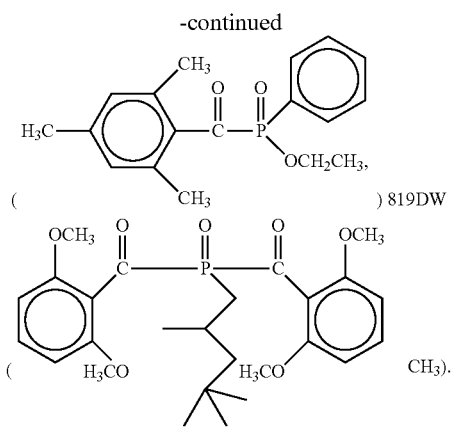

) 819DW

In some embodiments, the polymerizable liquid may optionally comprise blocked or reactively blocked diisocynate. In some embodiments, the blocked or reactively blocked diisocyanate may comprise a compound of the following formula:

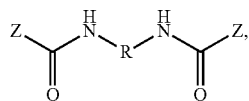

where R is a hydrocarbyl group and Z is a blocking group. Examples of the blocking group Z may include but not limited to phenols, nonyl phenols, pyridinols, oximes, thiophenols, mercaptans, amides, cyclic amides, imides, imidazole, imidazoline, Methylethylketoxime (MEKO), alcohols, ε-caprolactam, pyrazoles, triazoles, amidines, hydroxamic acid ester. The linkage between the blocking group Z and the isocyanate groups (—NCO) is thermally or otherwise liable so that under proper conditions, such linkage may break to exposed the isocyanate group, enabling the free isocyanate to react with other components in the polymerizable liquid for further reaction. In some embodiments, the blocking group Z optionally comprises a reactive terminal group, which makes the diisocyanate reactively blocked. Examples of the reactive terminal group of Z may include but not limited to epoxy, alkene, alkyne, thio, vinyl either. In one embodiment, the blocking Z is tert-butyl aminoethyl methacrylate (t-BAEMA) with the following structure:

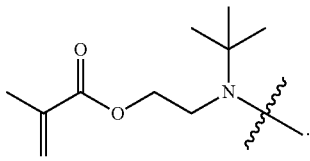 [SMILES: *N(CCOC(=O)C(=C)C)C(C)(C)C]

In this example, the steric hindrance of the large tertiary butyl group makes the linkage between the blocking group and the isocyanate (—NCO) group thermally labile. Cleavage of this bond may be expected upon heating, allowing the isocyanate (—NCO) group to react with other components in the polymerizable liquid for further reaction. In other examples, the blocking group Z may be tertiary phenylaminoethyl methacrylate (TPAEMA), tertiary hexylaminoethyl methacrylate (THAEMA), tertiary-butylaminopropyl methacrylate (TBAPMA), and mixture thereof. Those skilled in the art may couple (meth) acrylate groups to known NCO blocking agents as identified above.

Some embodiments of the present invention disclosed a method of forming a three-dimensional object using the polymerizable liquids described herein. The method may comprise the following steps:

(1) providing a printing region defined by a forming platform and a resin reservoir having a forming surface;
(2) filling the printing region with a polymerizable liquid comprising:
   a) a prepolymer as described herein;
   b) (optional) a reactive diluent;
   c) a photoinitiator; and
   d) (optional) a blocked or reactively blocked diisocyanate;
(3) exposing the printing region to light to form a solid printing intermediate having substantially the same shape as the three-dimensional object; in some embodiments;
(4) (optional) washing the printing intermediate;
(5) heating, microwave irradiating, exposing to water vapor or using other methods to provide energy to the printing intermediate to form the three-dimensional object through a second step of curing; under heating, microwave irradiating, moisturizing conditions or other known conditions, the blocking groups at the one end of the prepolymer and/or the protecting group at the other end of the prepolymer will undergo cleavage, which means that the linkage between the blocking/protecting groups and the blocked/protected parts will be cleaved so that the blocked/protected functional groups can be exposed for further curing. An example of the curing scheme is described in FIG. 1.

In this example, the prepolymer comprises ethylenically unsaturated blocked NCO functional group (BI) at one end and protected amino functional group (BA) at the other end. In some embodiments, the protected amino functional group can further comprise an ethylenically unsaturated terminal end. In some embodiments, in addition to the blocked NCO functional group and the amino functional group, the prepolymer may further comprise another ethylenically unsaturated terminal group. When the polymerizable liquid in this example is exposed to light, a crosslinked network, i.e., the printing intermediate will be formed. Following the photopolymerization, under heating, microwave irradiating, moisturizing conditions, or other known suitable conditions, the blocking group that block the isocyanate functional groups on one end of the prepolymer are cleaved and expose them for further curing. Also under the same condition, the protecting groups on the other end of the prepolymer that protect the amino functional groups are also cleaved and expose the amino functional groups to react with isocyanate functional groups to form a network that comprises the following: (a) linear thermoplastic polyurethane, polyurea, and/or copolymer thereof; (b) crosslinked thermoset polyurethane, polyurea, and/or copolymer thereof; (c) UV-cured polyacrylates (linear or crosslinked); (d) copolymer of polyurethane, polyurea, and/or copolymer thereof and UV-cured polyacrylates; and (e) combinations thereof. When the prepolymer comprises a reactive terminal end in addition to the blocked isocyanate group and the protected amino group, the polyurethane part of network and polyacrylates part of network can be covalently bonded. When the prepolymer doesn't comprise such reactive terminal end in addition to the blocked isocyanate group and the protected amino group, the formed network will only comprise an interpenetrating polymer network (IPN), a semi- or pseudo-IPN, or a sequential IPN of polyurethane and polyacrylates.

Embodiments of the polymerizable liquids disclosed in the present invention can be used to manufacture three-dimensional objects using commonly known photopolymerization 3D printing technologies, such as stereolithography (SLA), Digital Light Processing (DLP), and Material Jetting (MJ). In some embodiments, an additive manufacturing method to produce three-dimensional objects using the polymerizable liquids of the present invention comprises the following steps:
 (a) providing a printing region defined by a forming platform and a resin reservoir having a forming surface;
 (b) filling said printing region with the polymerizable liquid disclosed in the present invention;
 (c) exposing the printing region to energy to form a solid printing intermediate having substantially the same shape as the three-dimensional object;
 (d) (optional) washing said printing intermediate; and
 (e) heating, microwave irradiating, or using other methods to provide energy to said printing intermediate to form said three-dimensional object.

In some embodiments, in the method described herein, the polymerizable liquid comprise from 1 percent by weight to 99 percent by weight the prepolymer; and from 1 percent by weight to 30 percent by weight the photoinitiator.

In some embodiments, the solid printing intermediate is first manufactured by a DLP printer through the first curing step of photopolymerization. In some embodiments, the wavelength used to initiate the photopolymerization process is 405 nm and in other embodiments, the wavelength is 385 nm. Any suitable photoinitiator that can initiate the photopolymerization reaction with the light source used herein may be used. In some preferred embodiments, light with the wavelength longer than 400 nm is used to initiate the photopolymerization. In particular, 405 nm wavelength is used. In these preferred embodiments, photoinitiator Irgacure 819 is used for light with wavelength longer than 400 nm because 819 has a strong absorption in the family of phosphine oxide type of photoinitiator in the long wavelength UV range.

After the printing intermediate is formed, it is optionally washed and dried. In some embodiments, the washing liquid may be aqueous and comprise water and surfactant. In some embodiments, the water can be deionized water. Examples of surfactant may include but not limited to anionic surfactants (e.g., sulfates, sulfonates, carboxylates, and phosphate esters), cationic surfactants, zwitterionic surfactants, non-ionic surfactants, etc., including combinations thereof. Common examples include, but are not limited to, sodium stearate, linear alkylbenzenesulfonates, lignin sulfonates, fatty alcohol ethoxylates, alkylphenol ethoxylates, etc., including combinations thereof.

After the optional washing step, the printing intermediate is further cured to form the final printed three-dimensional object. The second step of curing may be carried out by heat, moisturization, microwave irradiation, or other suitable energy source that can cleave the blocking/protecting groups used in the polymerizable liquid resins in order to initiate the second curing process. In some embodiments, the second step of curing is heating curing. In some embodiments, the temperature of the heat curing may be in the range of ambient temperature to 200° C. The length of the heat curing time may be in the range of 0.5 h~200 h. In some embodiments, the second step of curing is heating under moisturizing condition.

Embodiments of the present invention are explained in detail in the following non-limiting examples:

Example 1

Synthesis of Polyisocyanate Oligomer 200 grams anhydrous polybutylene glycol (PTMG 1000) is added into 500 ml three-necked flask with an overhead stir, a thermometer and nitrogen protection. 67.2 grams hexamethylene diisocyanate (HDI) is then added into the flask to form a homogeneous solution with PTMG with 10-min's stirring, followed by addition of 140 µl of dibutyltindilaurate (DBTL) catalyst at 70° C. for 3 hours to form the polyisocyanate oligomer. The reaction scheme is illustrated in the following:

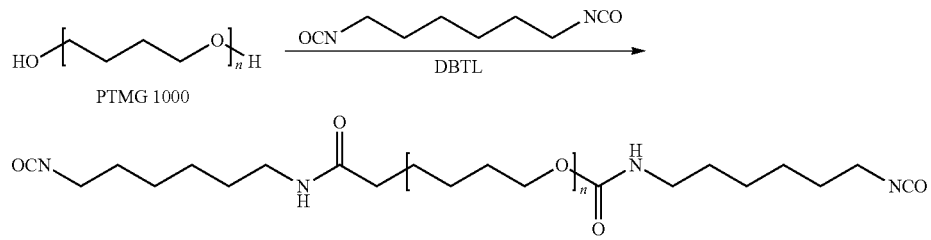

Example 2

Synthesis of Prepolymer with Reactively Blocked Isocyanate Functional Group on One End and Hydroxyl Functional Group on the Other End PTMEG2000 and IPDI (equivalence ratio of 1:2) are added into three-neck flask together with 300 ppm Dibutyltin dilaurate (DBTL) catalyst. The reactants are mixed at 75° C. (oil bath) for 2 hours. 500 ppm 4-methoxyphenol (MEHQ) inhibitor is then added into the mixture. Tertiary-butylaminoethyl methacrylate (tBAEMA) (equivalence ratio of tBAEMA to PTMEG2000=1:1) is added with a dropping funnel. Once all tBAEMA is added, the reaction continues for another 30 minutes before the temperature is lowered to 40° C. Ethanol amine is then added quickly into the mixture. The reaction continues for another 30 min. At the end of the 30 min, a sample product is obtained for IR analyses to detect any remaining NCO absorption peak. Once no NCO absorption peak is observed, the reaction is complete. The chemical structure of the synthesized prepolymer is shown in the following:

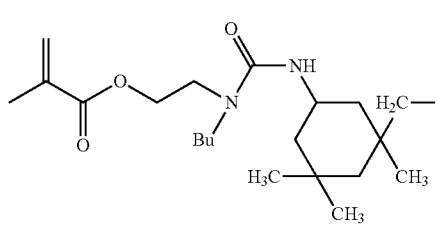
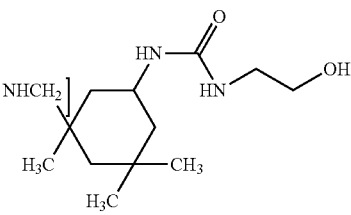

Example 3

Synthesis of Prepolymer with Non-Reactively Blocked Isocyanate Functional Group on One End and Amino Functional Group on the Other End PTMEG2000 and IPDI (equivalence ratio of 1:2) are added into three-neck flask together with 300 ppm Dibutyltin dilaurate (DBTL) catalyst. The reactants are mixed at 75° C. (oil bath) for 2 hours. 500 ppm 4-methoxyphenol (MEHQ) inhibitor is then added into the mixture. Methyl ethyl ketoxime (equivalence ratio of ketoxime to PTMEG2000=1:1) is added with a dropping funnel. Once all ketoxime is added, the reaction continues for another 30 minutes before the temperature is lowered to 40° C. Ethylenediamine is then added quickly into the mixture. The reaction continues for another 30 min. At the end of the 30 min, a sample product is obtained for IR analyses to detect any remaining NCO absorption peak. Once no NCO absorption peaks, the reaction is complete. The chemical structure of the synthesized prepolymer is shown in the following:

(equivalence ratio is 1:1) are added into three-neck flask together with 500 ppm 4-methoxyphenol (MEHQ) inhibitor and 150 ml hexane with one port installed with Dean-stark trap and Allihn reflux condenser. After the reactants reflux at 80° C. for about four hours, the weight of water collected by the Dean-stark trap is measured. When the collected water reaches 75% weight of ideal 100% yield water amount, the reaction is complete. The chemical structure of the protected diamine is shown in the following:

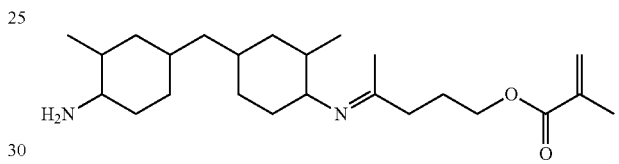

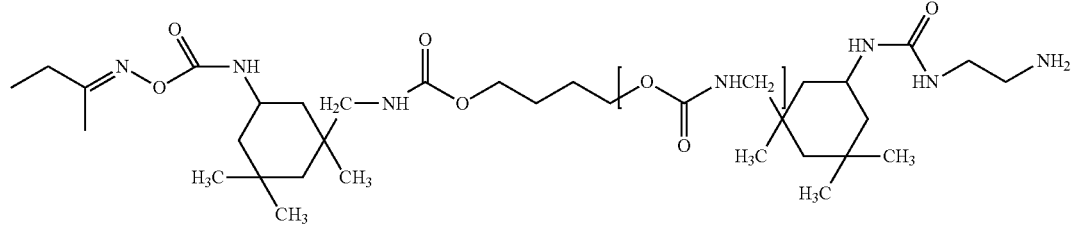

Example 4

Synthesis of the Diamine with One Amino Group Protected with Ketone 3,3-Dimethyl-4,4-diaminodicyclohexylmethane (DMDC) and dipentanone methacrylate

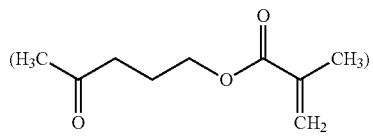

We claim:

1. A prepolymer compound of formula X:

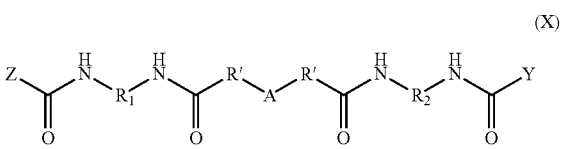

wherein:

Z is a blocking group;

$R_1$, $R_2$, and A are each independently selected a hydrocarbyl group;

R' is NH or O; and

Y comprises an amino alcohol or diamine moiety, wherein an amino group side of the amino alcohol moiety is attached to the prepolymer compound and a hydroxyl functional group of the amino alcohol moiety is at a free end; an amino group of the diamine moiety is attached to the prepolymer compound and another amino functional group of the diamine moiety is at the free end.

2. The prepolymer compound of claim 1, wherein Z comprises a reactive epoxy, alkene, alkyne, or thiol terminal group.

3. The prepolymer compound of claim 1, wherein Z is tert-butyl aminoethyl methacrylate (t-BAEMA).

4. The prepolymer compound of claim 1, wherein Z comprises an oxime moiety.

5. The prepolymer compound of claim 1, wherein Z is 2-butanone oxime.

6. The prepolymer compound of claim 1, wherein Y comprises more than one terminal hydroxyl group.

7. The prepolymer compound of claim 1, wherein Y comprises a photopolymerizable group.

8. The prepolymer compound of claim 7, wherein said photopolymerizable group comprises an acrylate or methacrylate group.

9. The prepolymer compound of claim 1, wherein a free end of Y is attached with a protecting group that protects the hydroxyl group of said amino alcohol or the amino group of said diamine.

10. The prepolymer compound of claim 9, wherein said protecting group comprises an aldehyde or a ketone moiety.

11. The prepolymer compound of claim 9, wherein said protecting group further comprises a photopolymerizable terminal group.

12. The prepolymer compound of claim 1, wherein A is a branched hydrocarbyl group and comprises a photopolymerizable terminal group.

13. A polymerizable liquid used for producing three-dimensional objects by methods of additive manufacturing, said polymerizable liquid comprising:
a prepolymer compound of claim 1; and
a photoinitiator.

14. A method of forming a three-dimensional object, comprising:
providing a printing region defined by a forming platform and a resin reservoir having a forming surface;
filling said printing region with a polymerizable liquid, said polymerizable liquid including a prepolymer compound and a photoinitiator, the prepolymer compound having formula X:

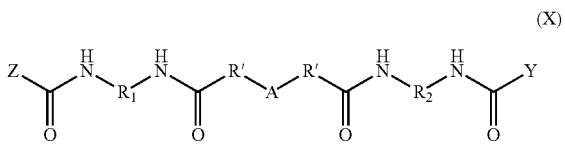

wherein:
Z is a blocking group;
$R_1$, $R_2$, and A are each independently selected a hydrocarbyl group;
R' is NH or O; and
Y comprises an amino alcohol or diamine moiety, wherein an amino group side of the amino alcohol moiety is attached to the prepolymer compound and a hydroxyl functional group of the amino alcohol moiety is at a free end; an amino group of the diamine moiety is attached to the prepolymer compound and another amino functional group of the diamine moiety is at the free end;
exposing said printing region filled with said polymerizable liquid to energy to form a solid printing intermediate having substantially the same shape as said three-dimensional object; and
providing energy to said solid printing intermediate to form said three-dimensional object.

15. The method of claim 14, wherein said three-dimensional object comprises a copolymer of polyurethane and polyacrylate.

16. The method of claim 14, wherein the providing energy to said solid printing intermediate includes:
heating said solid printing intermediate in a range of ambient temperature to 200° C. for 2 to 12 hours.

17. The polymerizable liquid of claim 13, said polymerizable liquid further comprising:
a reactive diluent.

18. The polymerizable liquid of claim 13, said polymerizable liquid further comprising:
a blocked or reactively blocked diisocyanate.

19. The method of claim 14, said method further comprising:
washing said solid printing intermediate.

* * * * *